Nov. 2, 1965 T. LINDENBERG 3,215,439
COMPLIANT PHONOGRAPH STYLUS MOUNTING
Filed May 3, 1963
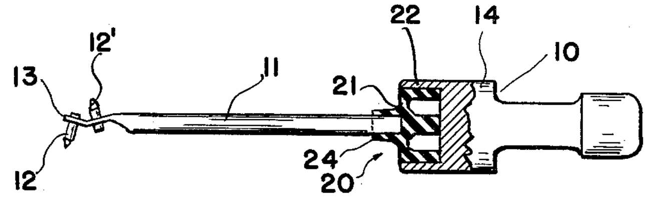
FIG. 1
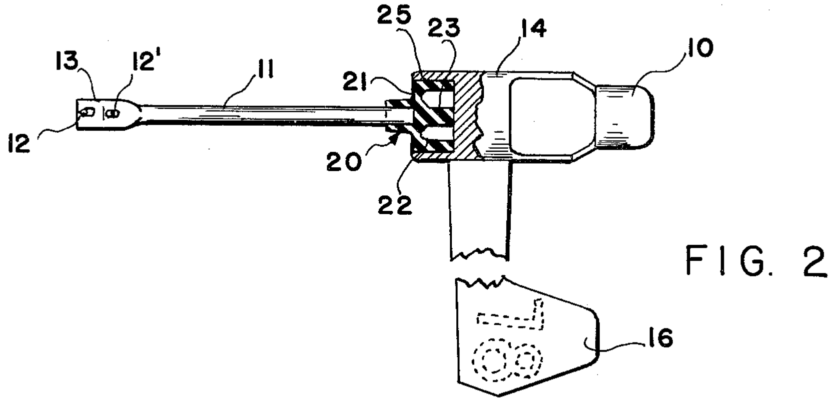
FIG. 2
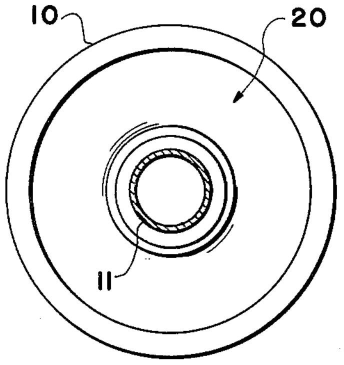
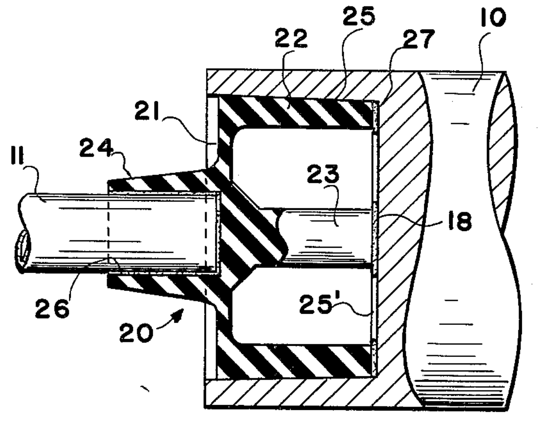
FIG. 4 FIG. 3
INVENTOR.
THEODORE LINDENBERG
BY
Francis J. Klempay
ATTORNEY United States Patent Office 3,215,439
Patented Nov. 2, 1965

3,215,439
COMPLIANT PHONOGRAPH STYLUS MOUNTING

Theodore Lindenberg, Conneaut, Ohio, assignor to The Astatic Corporation, Conneaut, Ohio, a corporation of Ohio Filed May 3, 1963, Ser. No. 277,784
3 Claims. (Cl. 274—37)

This invention relates generally to the art of reproducing recorded material from phonograph records and more particularly to stylus assemblies for use with phonograph pickup cartridges. It is desirable to provide a pickup cartridge with a stylus which can be changed readily to accommodate different types of record disks. Numerous attempts have been made to mount at least two different kinds of stylus tips on a common mounting member and to change from one tip to the other simply by turning over the mounting member. One such method and assembly is illustrated in U.S. Patent No. 2,848,559 to M. M. Palo.

In the above-mentioned Palo patent the mechanical compliance of the stylus mounting member in its holder is intentionally made to be greater in a horizontal plane than in a vertical plane with respect to the record surface. This condition is preferred in reproducing lateral-cut monaural records. In the reproduction of modern stereo records, however, where two signals are reproduced from a single groove, the requirements are vastly different. It is in consideration of these requirements and novel means for meeting them that the present invention is directed.

The stylus and the stylus mounting for a stereo cartridge should ideally be equally compliant in all directions normal to the record groove being scanned. This presupposes that the cartridge itself is equally responsive to motion in all of the same directions. In other words, the stylus mounting should impose no substantial restraint upon the equally free motion of the stylus tip in any direction through 360° in a plane normal to a record groove. At the same time, the stylus tip must be firmly restrained against motion fore and aft in the direction of the record groove. Since a stylus tip must have finite length it is, in effect, a lever arm which has the capability of applying torque to the stylus mounting member and it is therefore essential also that the support for the stylus mounting member restrain the same against torsional motion.

All the above conflicting requirements are met by the stylus mounting of this invention. The parts required for my new assembly are extremely simple and economical to manufacture and their fabrication and assembly is effected much more economically than are comparable operations in prior art assemblies.

It is accordingly the primary object of the present invention to provide a new and improved means for attaching a stylus support member to its mounting means.

A further object is the provision of means for attaching a stylus support member to its mounting means which affords a required degree of flexibility to said member in all directions normal to the record groove.

Another object is the provision of attaching means of the kind set forth which affords security against axial motion of the support member in relation to its mounting means.

Yet another object of the invention is the provision of means in such attachment to prevent torsional motion of said support member with relation to its mounting means.

The above and other objects and advantages of the invention will become apparent upon consideration of the following specification and the accompanying drawing wherein there is disclosed a preferred embodiment of the invention.

In the drawing:

FIGURE 1 is a side view, partly in section, of the stylus support and securing handle of the invention;

FIGURE 2 is a plan view, also partly in section, of the device of FIGURE 1;

FIGURE 3 is an enlarged sectional view of that portion of the device of FIGURE 1, which shows the attaching means of the present invention; and FIGURE 4 is an end elevation of the attaching means of the invention.

In the drawing, FIGURES 1 and 2 illustrate a complete stylus assembly and holder having the general appearance of the unit disclosed in U.S. Design Patent 188,763. The stylus and holder of FIGURES 1 and 2 are adapted to be used in a phonograph pickup cartridge in the manner disclosed and claimed in the above-mentioned Palo Patent No. 2,848,559. As known to those familiar with the art, it is common practice to employ an elongated stylus which extends generally parallel with or tangent to the record groove, having a groove-engaging tip at its forward end, and anchored in a suitable holder or handle at its rear end, and the holder or handle being normally fixed with relation to the pickup cartridge. A suitable drive, not shown herein, is provided to couple the forward end portion of the stylus with the transducer in the cartridge.

In compliance with the above, stylus and holder shown herein comprises a molded handle 10 which is adapted to be secured to the underside of a pickup cartridge, a forwardly extending elongated stylus support member 11 and a record engaging stylus tip 12 secured near the extreme forward end of support member 11. A second stylus tip 12' may also be provided adjacent to the tip 12 for alternate use in transcribing other records.

The stylus support member 11 may conveniently be made of very thin-walled aluminum tubing, it being of prime importance that this member have a most favorable strength-to-weight ratio. When metal tubing is used in support member 11 it is customary to flatten the front end thereof, as at 13, to provide an area into which the stylus tip or tips 12 and 12' may be attached.

The molded handle 10 may be formed suitably of metal or plastic and, according to the above-mentioned Palo patent, it may have a generally cylindrical portion 14 which is rotatably received in a suitable recess in the associated pickup cartridge. A flattened portion, as shown, is provided to index the handle 10 as to its angular relation with the associated cartridge. A radially extending operator 16 is provided by which the handle 10 may be rotated from one operative position to another in those cases where two stylus tips are to be engaged selectively.

In prior art stylus assemblies of this type, it has been customary to provide a flexible connection between the support member 11 and the handle 10, somewhat in the manner disclosed in the aforementioned Palo patent. That is, a flat portion of support member 11 is inserted in a flattened rubber block or strip, the rubber strip and the end of support 11 are inserted into a flattened recess in the end of cylindrical portion 14, and a transverse pin is passed diametrically through portion 14 to transfix the flattened rear end of support 11 and to hold it locked into assembly with the handle 10. This method of securing imparts a substantially greater degree of compliance to the juncture between support 11 and handle 10 in the direction of compliance imparted in the wide face direction thereof. It is to the remedy of this assymetric compliance condition that the present invention is directed.

In the preferred embodiment of my invention illustrated in the drawing, I provide a molded elastic coupling 20 to connect the stylus support 11 to the handle 10. Coupling 20 comprises an integral molding consisting of a radially disposed web 21, a rearwardly extending outer sleeve 22, a cylindrical center ligature 23 and a forwardly extending tube 24.

The rear end of coupling 20 is received in a recess 25 formed in the forward end of handle 10. The rear end of stylus support 11 is received in the tube 24 and is secured there by a thin film of cement 26. Web 21 is an extremely thin diaphragm-like membrane which maintains the tube 24 central with respect to the recess 25 and the handle 10. Web 21 exhibits substantial resistance to torsional motion of support 11 but yet permits a hinging action to take place and thus to afford free swinging motion for the front end of support 11 in all directions normal to its own centerline.

Outer sleeve 22 is snugly received in recess 25 and its rear edge is adhered to the back wall 25' of recess 25 by a layer of cement 27. A similar adhesive 18 secures the end of ligature 23 to back wall 25'.

Outer sleeve 22 and ligature 23 are of precisely the same length so that when assembled into recess 25, they combine to maintain the web 21 disposed transversely to the support 11 and parallel with the back wall 25'. Ligature 23 affords restraint to the center of web 21 so that the latter may move neither inwardly nor outwardly in the direction of the axis of support 11.

While outer sleeve 22 is shown as being a tube-like member which occupies the inner peripheral wall of recess 25, I consider this to be only an expedient means of securing the outer edge of the web 21. If it is desired to secure the extreme outer edge of web 21 directly to the edge of handle portion 10 near the front lip of recess 25, this is to be considered within the purview of the present invention.

While the genus of the present invention illustrated in the drawing shows a handle member 10 which is adaptable for manual removal and replacement with respect to its associated cartridge, it will be evident that my novel stylus support web 21 and ligature 23 serve equally well to achieve the benefits here postulated if they are combined with a cavity similar to recess 25 which recess may be formed as an integral part of the pickup cartridge itself.

I have thus provided a stylus assembly for use with phonograph cartridges which accomplishes the objects initially set forth. The coupling member 20, when adhered in position, affords a secure means of connecting stylus support 11 to its support, in this case to handle 10. Freedom for unimpeded lateral swinging motion in all directions is afforded to the forward end of support 11 by the inherent flexibility of web 21 and by its edge-anchored position across the open end of recess 25.

Axial motion of support 11 is prevented by the restraint applied by ligature 23. The relatively high length-to-breadth aspect of ligature 23 assures that it shall not provide any appreciable restraint to the swinging freedom of support 11. Since web 21 is of relatively large diameter as compared with the diameter of support 11, it will be evident that its radial extent affords appreciable resistance to torsional motion of support 11.

Having thus described my invention, what I claim is:

1. For use with a phonograph pickup cartridge, an assembly of a stylus mounting member adapted to be normally fixed with respect to the cartridge and having a recess extending rearwardly from its front wall, an integrally molded flexible member having an outer rim slideably received in said recess and also having a centrally disposed hub portion having a forwardly extending opening therein, an elongated stylus mounting a record groove engaging tip at its forward end and having its rear end portion firmly received in the opening in said hub portion of said integrally molded member, said hub portion being connected to said rim portion by a diaphram-like section whereby the forward end of said stylus has equal and substantially unimpeded freedom of movement in any direction normal to the principal axis of the stylus member, said integrally molded member having a centrally disposed ligature connected to and projecting rearwardly from said hub portion, and the rear end of said ligature being secured to the bottom wall of the recess in said stylus in an axial direction is effectively impeded.

2. For use with a phonograph pickup cartridge, an assembly of a stylus mounting member adapted to be normally fixed with respect to the cartridge and having a recess extending rearwardly from its front wall, an integrally molded flexible member having a centrally disposed hub portion and an outwardly flaring diaphragm-like flange, means to secure the outer periphery of said flange to the outer rim of said recess, an elongated stylus mounting a record groove engaging tip at its forward end and having its rear end portion firmly received in said hub portion of said integrally molded member, the arrangement being such that said diaphragm-like flange permits the forward end of said stylus to have equal and substantially unimpeded freedom of movement in any direction normal to the principal axis of the stylus, said integrally molded member having a rearwardly extending ligature secured to said hub portion, and means to secure the rear end of said ligature to the bottom wall of the recess in said stylus mounting member whereby said ligature impedes axial movement of said stylus in either direction.

3. For use with a phonograph pickup cartridge, an assembly of a stylus mounting member adapted to be normally fixed with respect to the cartridge, a flexible diaphragm-like member secured at its periphery to said stylus mounting member, and an elongated stylus mounting a record groove engaging tip at its forward end and having its rear end portion firmly attached to the free center portion of said diaphragm-like member, the arrangement being such that the tip end of said stylus may have equal and substantially unimpeded freedom of movement in any direction normal to the principal axis of the stylus, a flexible ligature in substantial axial alignment with said stylus and interconnecting the side wall of said flexible diaphragm-like member opposite said stylus to said stylus mounting member whereby said stylus is restrained against axial movement with respect to said stylus mounting member.

References Cited by the Examiner

UNITED STATES PATENTS

| | | | |
|---|---|---|---|
| 1,812,634 | 6/31 | Jones | 274—37 |
| 2,881,005 | 4/59 | Michalko et al. | 274—37 |

NORTON ANSHER, *Primary Examiner.*